United States Patent
Mastrocola et al.

(10) Patent No.: US 11,598,440 B2
(45) Date of Patent: Mar. 7, 2023

(54) PASSIVE HEX FLOW REGULATION

(71) Applicant: Hamilton Sundstrand Corporation, Charlotte, NC (US)

(72) Inventors: Naison E. Mastrocola, Goshen, CT (US); William E. Villano, Canton, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 609 days.

(21) Appl. No.: 16/593,729

(22) Filed: Oct. 4, 2019

(65) Prior Publication Data
US 2021/0102634 A1 Apr. 8, 2021

(51) Int. Cl.
| | | |
|---|---|---|
| *F16K 31/02* | (2006.01) | |
| *F28F 3/04* | (2006.01) | |
| *F16K 49/00* | (2006.01) | |
| *F16K 31/00* | (2006.01) | |

(52) U.S. Cl.
CPC ........... *F16K 31/002* (2013.01); *F16K 49/00* (2013.01); *F28F 3/04* (2013.01); *F16K 31/025* (2013.01); *F28F 2215/14* (2013.01); *F28F 2255/00* (2013.01); *Y10T 137/6525* (2015.04); *Y10T 137/7737* (2015.04)

(58) Field of Classification Search
CPC ...... F16K 31/002; F16K 31/025; F16K 49/00; F16K 49/007; F28F 3/04; F28F 2255/00; F28F 2255/04; F28F 2255/02; F28F 2215/00–14; Y10T 137/6525; Y10T 137/7737
USPC ................................................. 137/338, 468
See application file for complete search history.

(56) References Cited

U.S. PATENT DOCUMENTS

| | | | |
|---|---|---|---|
| 6,039,262 A | 3/2000 | DeAnna | |
| 6,608,752 B2 | 8/2003 | Morris et al. | |
| 8,132,616 B1 | 3/2012 | Brower et al. | |
| 8,651,142 B2 * | 2/2014 | Sellers | F03G 7/065 60/770 |
| 9,671,030 B2 | 6/2017 | Dimascio et al. | |
| 10,113,818 B2 | 10/2018 | Agee | |
| 10,253,785 B2 | 4/2019 | Kenworthy et al. | |
| 2002/0013555 A1* | 1/2002 | Seward | F16K 99/0057 251/129.01 |
| 2009/0056350 A1 | 3/2009 | Germann et al. | |

(Continued)

FOREIGN PATENT DOCUMENTS

| | | |
|---|---|---|
| DE | 102017009397 A1 | 4/2018 |
| DE | 102017009424 A1 | 4/2018 |

(Continued)

OTHER PUBLICATIONS

Extended European Search Repod dated Jul. 20, 2020, received for corresponding European Application No. 19215684.2, 6 pages.

*Primary Examiner* — Kevin F Murphy
*Assistant Examiner* — Jonathan J Waddy
(74) *Attorney, Agent, or Firm* — Kinney & Lange, P.A.

(57) ABSTRACT

A heat exchanger is configured to adjust a flow restriction of flow passages through the heat exchanger in response to changes in temperature of elements that define at least a portion of the flow passages. The elements include a first material having a first coefficient of thermal expansion, and a second material having a second coefficient of thermal expansion that is different from the first coefficient of thermal expansion.

18 Claims, 3 Drawing Sheets

(56) References Cited

U.S. PATENT DOCUMENTS

| | | | |
|---|---|---|---|
| 2010/0043413 A1* | 2/2010 | Orihashi | F28F 1/14 |
| | | | 60/320 |
| 2012/0279242 A1* | 11/2012 | Seybold | F25B 40/00 |
| | | | 62/190 |
| 2018/0023906 A1 | 1/2018 | Tajiri et al. | |
| 2018/0038513 A1* | 2/2018 | Baldea | F16K 31/002 |
| 2018/0058327 A1* | 3/2018 | Tajiri | F02K 3/04 |
| 2018/0355990 A1 | 12/2018 | Simpson | |

FOREIGN PATENT DOCUMENTS

| | | | |
|---|---|---|---|
| EP | 0661741 A1 | 7/1995 |
| EP | 3415858 A1 | 12/2018 |
| JP | 1984120375 U | 7/1984 |
| JP | 60164192 A | 8/1985 |

* cited by examiner

PASSIVE HEX FLOW REGULATION

BACKGROUND

The present disclosure relates to heat exchangers, and in particular to heat exchangers with flow regulation.

Heat exchangers are often used to transfer heat between two fluids. For example, in aircraft environmental control systems, heat exchangers may be used to transfer heat between a relatively hot air source (e.g., bleed air from a gas turbine engine) and a relatively cool air source (e.g., ram air). Some heat exchangers, often referred to as tube-fin heat exchangers, include a tube core and heat transfer fins, often formed of a material with high thermal conductivity (e.g., aluminum), attached to the tube core and oriented in the direction of the flow within the passage. The heat transfer fins increase turbulence and a surface area that is exposed to the airflow, thereby enhancing heat transfer between a hot fluid traveling in the tube core and the airflow. A first fluid travels through the tube, and a second fluid flows through the fins of the heat exchanger. Commonly the heat transfer of such a heat exchanger is actively controlled by either altering the flow of the liquid through the tube or using blocker doors to control the flow of the air around the fins. Due to existing structures and manufacturing techniques, known tube-fin heat exchangers are heavy, require control loops, and add failure modes to the system.

SUMMARY

In one embodiment, a heat exchanger is configured to adjust a flow restriction of flow passages through the heat exchanger in response to changes in temperature of elements that define at least a portion of the flow passages. The elements include a first material having a first coefficient of thermal expansion, and a second material having a second coefficient of thermal expansion that is different from the first coefficient of thermal expansion.

In another embodiment, a heat exchanger includes a base and a plurality of fins extending from the base. Each fin of the plurality of fins includes a base end connected to the base, a distal end opposite the base end, a first section, and a second section. The first section includes a first material and the first section extends from the base end to the distal end. The second section includes a second material and the second section extends from the base end to the distal end. The first material and the second material have different coefficients of thermal expansion.

In another embodiment, a method of altering a flow area of flow passages in a heat exchanger includes altering temperatures of a plurality of elements that define at least portions of flow passages of the heat exchanger. Shapes of the plurality of elements are altered in response to the altering of temperatures, and flow area of the flow passages is altered via the altering of the shapes.

Persons of ordinary skill in the art will recognize that other aspects and embodiments are possible in view of the entirety of the present disclosure, including the accompanying figures.

Figure 1:
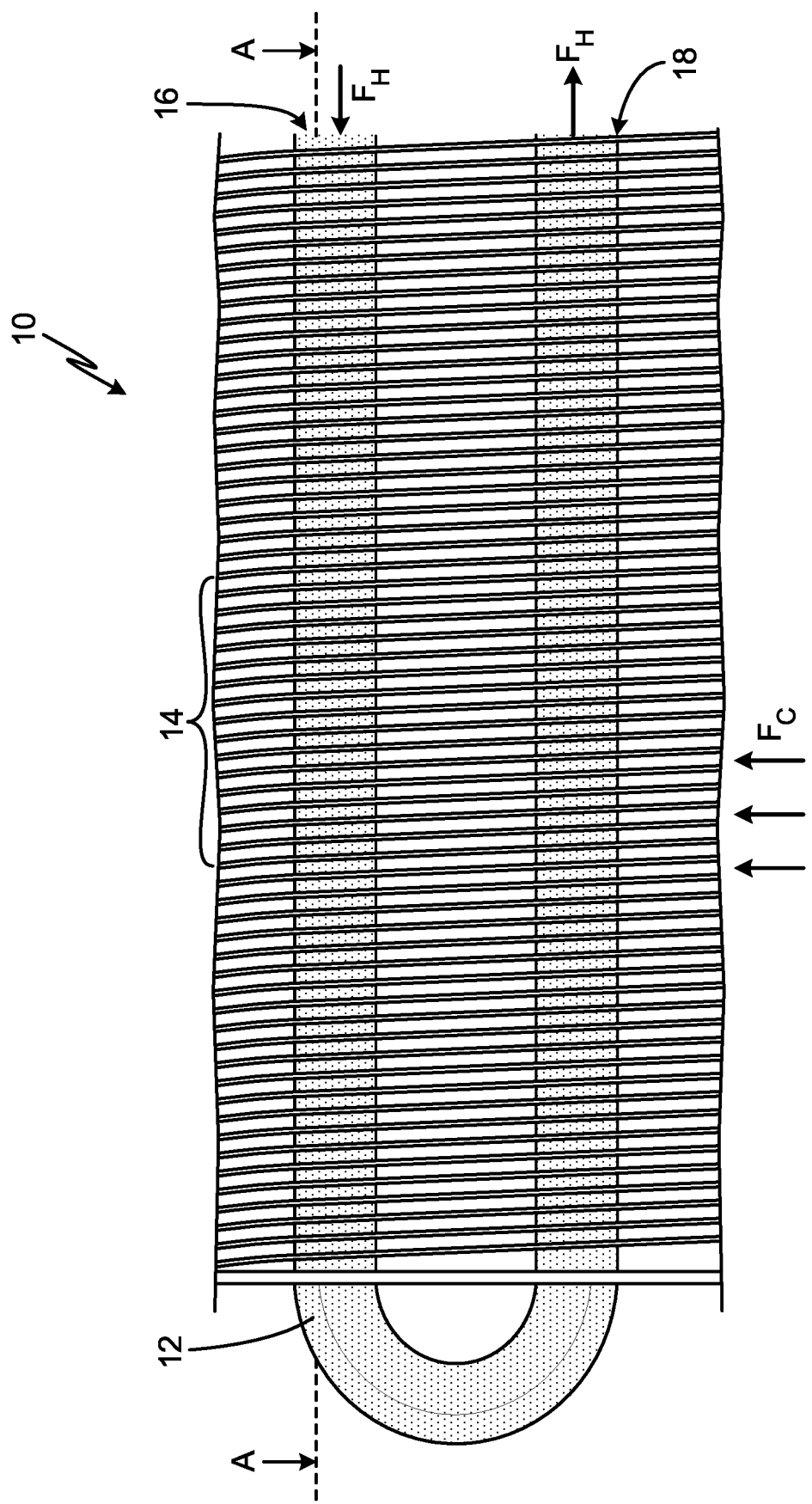
FIG. 1 is a perspective view of a heat exchanger.

While the above-identified drawing figures set forth one or more embodiments, other embodiments are also contemplated. It should be understood that numerous other modifications and embodiments can be devised by those skilled in the art, which fall within the scope and spirit of the principles of the claims. The figures may not be drawn to scale, and applications and embodiments may include features and components not specifically shown in the drawings. Like reference numerals identify similar structural elements.

DETAILED DESCRIPTION

The disclosure relates to a heat exchanger with a plurality of fins. Each fin of the plurality of fins is bimetallic and can be configured passively to regulate the flow of the cooling fluid across the fins of the heat exchanger. The passive flow regulating heat exchanger is described below with reference to FIGS. 1-3.

FIG. 1 is a perspective view of heat exchanger 10. Heat exchanger 10 includes base 12 and a plurality of fins 14. In the present embodiment, base 12 is a tube and fins 14 are connected to base 12. Base 12 winds back and forth through fins 14. Each pass of base 12 through fins 14 increases the surface area of base 12 that contacts fins 14, thereby increasing the cooling capacity of heat exchanger 10.

Hot flow $F_H$, flows through base 12 starting at inlet 16 of base 12 and leaves at outlet 18 of base 12. Hot flow $F_H$ at inlet 16 is higher in temperature than hot flow $F_H$ at outlet 18. As hot flow $F_H$ travels through base 12, heat is transferred from hot flow $F_H$ into base 12. The heat in base 12 is then transferred to fins 14. Thus, fins 14 increase the cooling capacity of heat exchanger 10. To further encourage the transfer of heat from hot flow $F_H$, cold flow $F_c$ flows through fins 14. Cold flow $F_c$ can be a gas or a liquid. In the embodiment of FIG. 1, cold flow $F_c$ is an airflow. Fins 14 not only increase the surface area of heat exchanger 10, fins 14 also help control cold flow $F_c$. As discussed below with reference to FIGS. 2 and 3, Fins 14 are designed to optimize the cooling capacity of heat exchanger 10 by changing the shape of fins 14, or the height of fins 14, to increase the surface area and alter cold flow $F_c$.

Figure 2:
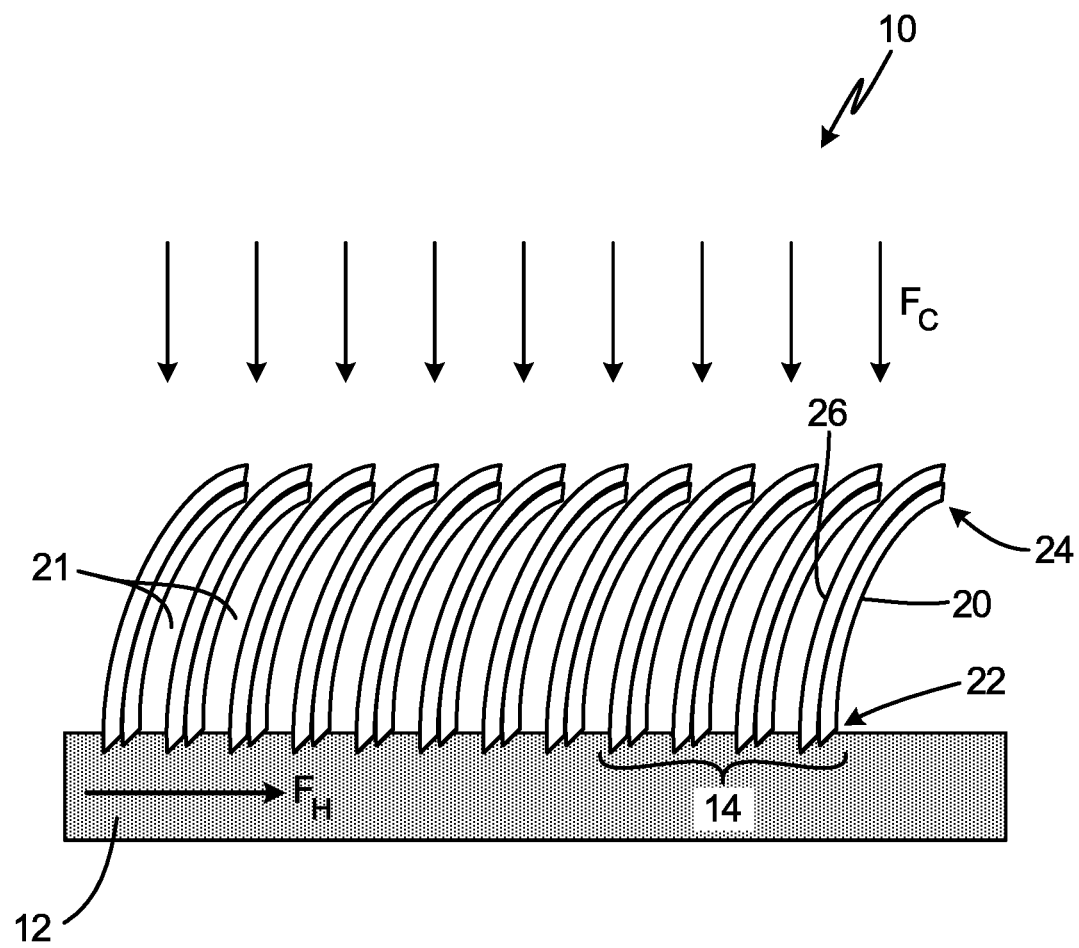
FIG. 2 is a cross-sectional view of a heat exchanger taken along line A-A in FIG. 1 showing a plurality of fins in a closed configuration.
Figure 3:
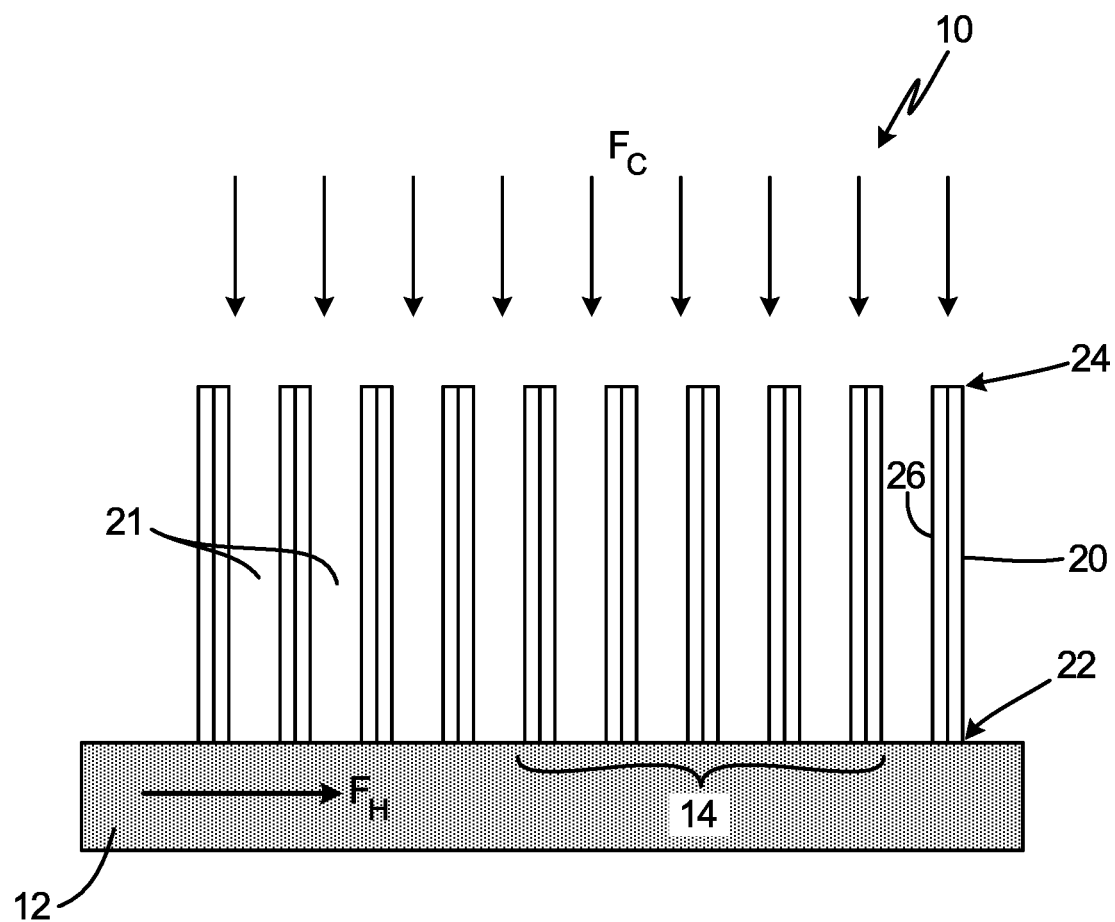
FIG. 3 is a cross-sectional view of a heat exchanger taken along line A-A in FIG. 1 showing a plurality of fins in an open configuration.

FIGS. 2 and 3 will be discussed concurrently. FIG. 2 is a cross-sectional view of heat exchanger 10 taken along line A-A in FIG. 1. In the embodiment of FIG. 2, fins 14 are in a closed position. FIG. 3 is a cross-sectional view of heat exchanger 10 taken along line A-A in FIG. 1. In the embodiment of FIG. 3, fins 14 are in an open configuration. Each fin 14 of the plurality of fins 14 includes first section 20, second section 26, base end 22, and distal end 24. Flow passages 21 are formed by fins 14. Each of flow passages 21 is formed between two fins 14.

First section 20 of fin 14 extends from base end 22 to distal end 24. Second section 26 is adjacent to and contiguous with first section 20. Similar to first section 20, second section 26 extends from base end 22 toward distal end 24. In one embodiment, first section 20 is a planar layer that forms a first surface. Second section 26 is a second planar layer adjacent to first section 20, and second section 26 forms a second surface opposite of the first surface. First section 20 and second section 26 of each fin 14 are made out of different materials. For example, first section 20 can include a first material selected from copper alloys, silver aluminum, and/or any other material with a relatively high thermal expansion coefficient found in bimetallic configurations. For instance, the first material of first section 20 can have a coefficient of thermal expansion greater than 17 fractional expansion units per million per expansion per degree Celsius. Second section 26 can include a second material selected from steel, iron, platinum, tungsten, and/or any other material with a thermal expansion coefficient less than the first material. For instance, the second material of second section 26 can have a coefficient of thermal expansion less than 14 fractional expansion units per million per degree Celsius. The first material of first section 20 and the second material of second section 26 are selected so that first section 20 and second section 26 have dissimilar coefficients of thermal expansion. When heat exchanger 10 is adequately cooling a system, or heat exchanger 10 is at rest, second section 26 is longer than first section 20, such that each fin 14 contacts an adjacent fin 14. When each fin 14 contacts an adjacent fin 14, flow passages 21 decrease in flow area and are at least partially closed to cool flow $F_c$. When first section 20 and second section 26 of each fin 14 contact an adjacent fin 14, fins 14 restricts cool flow $F_c$ from flowing freely into flow passages 21 and between fins 14, decreasing the cooling capacity and heat transfer of heat exchanger 10.

As heat exchanger 10 heats up and needs increased cooling capacity, first section 20 and second section 26 are configured to straighten, thereby opening flow passages 21 and increasing the flow area of flow passages 21. With flow passages 21 open, cold flow $F_c$ is able to flow through fins 14. Because first section 20 has a higher coefficient of thermal expansion than second section 26, first section 20 expands more than second section 26 as fin 14 heats up. As first section 20 expands in length, first section 20 pushes against second section 26 and straightens fin 14. First section 20 and second section 26 can be configured to move fins 14 at a set temperature range by choosing different materials for each first section 20 and second section 26. Using materials of different coefficient of thermal expansion enables first section 20 and second section 26 to be configured to regulate different temperature ranges, determined by the design parameters of a system connected to heat exchanger 10. When first section 20 and second section 26 are straightened, first section 20 and second section 26 can be the same length, or first section 20 or second section 26 can be longer than the other.

As shown in the embodiment FIGS. 2-3, first section 20 and second section 26 are essentially the same in width at base end 22 of fins 14 as at distal end 24 of fins 14. In other embodiments, first section 20 and second section 26 can be different geometries. For instance, first section 20 and second section 26 can be wider at base end 22 of fins 14 than at distal end 24 of fins 14. In another embodiment, first section 20 and second section 26 can be narrower at base end 22 of fins 14 than at distal end 24 of fins 14.

Heat exchanger 10 can be manufactured in many different ways. Base 12 and fins 14 can be manufactured together as a single component via additive manufacturing, or fins 14 can be made and subsequently joined to base 12. For example, first section 20 and second section 26 of fins 14 can be joined together through welding, brazing, pinning, or additive manufacturing. Next, fins 14 can be joined to base 12 via welding, brazing, and/or any other manufacturing process that joins fins to a base.

Discussion of Possible Embodiments

The following are non-exclusive descriptions of possible embodiments of the present invention.

In one embodiment, a heat exchanger is configured to adjust a flow restriction of flow passages through the heat exchanger in response to changes in temperature of elements that define at least a portion of the flow passages. The elements include a first material having a first coefficient of thermal expansion, and a second material having a second coefficient of thermal expansion that is different from the first coefficient of thermal expansion.

The heat exchanger of the preceding paragraph can optionally include, additionally and/or alternatively, any one or more of the following features, configurations and/or additional components:

the first material has a coefficient of thermal expansion of 19 units per million per degree Celsius and the second material has a coefficient of thermal expansion of 13 units per million per degree Celsius;

the heat exchanger is a tube and fin heat exchanger, and wherein the elements are fins;

the heat exchanger is a plate and fin heat exchanger, and wherein the elements are fins;

the first material is steel and the second material is copper or copper alloy; and the first material is a planar layer that forms a first surface, the second material is a second planar layer adjacent to the first section, and the second section forms a second surface opposite the first surface.

the first section is a planar layer that forms a first surface, the second section is a second planar layer adjacent to the first section, and the second section forms a second surface opposite the first surface.

In another embodiment, a heat exchanger includes a base and a plurality of fins extending from the base. Each fin of the plurality of fins includes a base end connected to the base, a distal end opposite the base end, a first section, and a second section. The first section includes a first material and the first section extends from the base end to the distal end. The second section includes a second material and the second section extends from the base end to the distal end. The first material and the second material have different coefficients of thermal expansion.

The heat exchanger of the preceding paragraph can optionally include, additionally and/or alternatively, any one or more of the following features, configurations and/or additional components:

the first material has a coefficient of thermal expansion of 19 parts per million per degree Celsius and the second material has a coefficient of thermal expansion of 13 parts per million per degree Celsius;

the distal end of a first fin of the plurality of fins is configured to contact a second fin when the heat exchanger is at a first temperature, and the first fin is configured to not contact the second fin when the heat exchanger is at a second temperature;

the base a tube and the base end of each fin of the plurality of fins is connected to the tube;

the base is a plate and the base end of each fin of the plurality of fins is connected to the plate;

the first section and the second section are joined together by brazing, pinning, welding, or a combination thereof; and the plurality of fins is made through additive manufacturing.

In another embodiment, a method of altering a flow area of flow passages in a heat exchanger includes altering temperatures of a plurality of elements that define at least portions of flow passages of the heat exchanger. Shapes of the plurality of elements are altered in response to the altering of temperatures, and flow area of the flow passages is altered via the altering of the shapes.

The method of altering a flow area of flow passages in a heat exchanger of the preceding paragraph can optionally include, additionally and/or alternatively, any one or more of the following features, configurations and/or additional components:

raising the temperatures of the plurality of elements such that the plurality of elements moves from a closed position to an open position; and lowering the temperatures of the plurality of elements such that the plurality of elements moves from the open position to the closed position, wherein each element of the plurality of elements comprises a first material adjacent to a second material, and wherein the first material comprises a higher coefficient of thermal expansion than the second material.

a distal end of each of the plurality of elements contacts an adjacent element when in a closed position, and the distal end of each of the plurality of element does not contact an adjacent element when in an open position;

the first material has a coefficient of thermal expansion of 19 units per million per degree Celsius and the second material has a coefficient of thermal expansion of 13 units per million per degree Celsius;

the heat exchanger is a tube and fin heat exchanger, and wherein the plurality of elements comprises fins; and/or the heat exchanger is a plate and fin heat exchanger, and wherein the plurality of elements comprises fins.

While the invention has been described with reference to an exemplary embodiment(s), it will be understood by those skilled in the art that various changes may be made and equivalents may be substituted for elements thereof without departing from the scope of the invention. For example, in the present embodiment base 12 is described as a tube, however, in another embodiment, base 10 could be a plate with fins 14 connected to base 12. In the embodiment where base 10 is a plate, heat exchanger 10 would operate similar to the embodiments discussed above with reference to FIGS. 1-3. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A heat exchanger configured to automatically adjust a flow restriction of flow passages through the heat exchanger in response to changes in temperature of elements that define at least a portion of the flow passages, the elements each comprising:
   a first end;
   a second end;
   a first material comprising a first coefficient of thermal expansion extending from the first end to the second end; and
   a second material comprising a second coefficient of thermal expansion different from the first coefficient of thermal expansion and contiguous with the first material,
   wherein the first end of the first material of a first element of the elements contacts the second material of a second element at a point between the first end and the second end of the second element when the heat exchanger is at a first temperature, and wherein the first element does not contact the second element when the heat exchanger is at a second temperature.

2. The heat exchanger of claim 1, wherein the first material has a coefficient of thermal expansion of 19 units per million per degree Celsius and the second material has a coefficient of thermal expansion of 13 units per million per degree Celsius.

3. The heat exchanger of claim 1, wherein the heat exchanger is a tube and fin heat exchanger, and wherein the elements are fins.

4. The heat exchanger of claim 1, wherein the heat exchanger is a plate and fin heat exchanger, and wherein the elements are fins.

5. The heat exchanger of claim 1, wherein the first material is steel and the second material is copper or copper alloy.

6. The heat exchanger of claim 1, wherein the first material is a planar layer that forms a first surface, the second material is a second planar layer adjacent to the first material, and the second material forms a second surface opposite the first surface.

7. A heat exchanger comprising:
   a base; and
   a plurality of fins extending from the base, wherein each fin of the plurality of fins comprises:
      a base end connected to the base;
      a distal end opposite the base end;
      a first section comprising a first material, wherein the first section extends from the base end to the distal end; and
      a second section comprising a second material, wherein the second section extends from the base end to the distal end contiguous with the first section, and wherein the first material and the second material have different coefficients of thermal expansion,
   wherein the first section at the distal end of a first fin of the plurality of fins contacts the second section of a second fin at a point between the distal end and the base end of the second fin when the heat exchanger is at a first temperature, and wherein the first fin does not contact the second fin when the heat exchanger is at a second temperature.

8. The heat exchanger of claim 7, wherein the first material has a coefficient of thermal expansion of 19 units per million per degree Celsius and the second material has a coefficient of thermal expansion of 13 units per million per degree Celsius.

9. The heat exchanger of claim 7, wherein the base is a tube and the base end of each fin of the plurality of fins is connected to the tube.

10. The heat exchanger of claim 7, wherein the base is a plate and the base end of each fin of the plurality of fins is connected to the plate.

11. The heat exchanger of claim 7, wherein the first section and the second section are joined together by brazing, pinning, welding, or a combination thereof.

12. The heat exchanger of claim 7, wherein the plurality of fins is made through additive manufacturing.

13. The heat exchanger of claim 7, wherein the base end of each fin of the plurality of fins is wider than the distal end of each fin of the plurality of fins.

14. A method of altering a flow area of flow passages in a heat exchanger comprising:
   altering temperatures of a plurality of fins that define at least portions of flow passages of the heat exchanger, wherein each fin of the plurality of fins comprises a first material adjacent to a second material, and wherein the first material comprises a higher coefficient of thermal expansion than the second material;

altering shapes of the plurality of fins in response to the altering of temperatures, wherein altering the shapes comprises either:
  raising the temperatures of the plurality of fins such that the plurality of fins moves from a closed position to an open position; or
  lowering the temperatures of the plurality of fins such that the plurality of fins moves from the open position to the closed position;
  wherein in the closed position a first material at a distal end of a first fin of the plurality of fins contacts a second material of a second fin at a point between a distal end and a base end of the second fin; and
altering the flow area of the flow passages via the altering of the shapes.

15. The method of claim 14, wherein a distal end of each of the plurality of fins contacts an adjacent fin when in the closed position, and the distal end of each of the plurality of clement fins does not contact an adjacent clement fin when in the open position.

16. The method of claim 14, wherein the first material has a coefficient of thermal expansion of 19 units per million per degree Celsius and the second material has a coefficient of thermal expansion of 13 units per million per degree Celsius.

17. The method of claim 14, wherein the heat exchanger is a tube and fin heat exchanger.

18. The method of claim 14, wherein the heat exchanger is a plate and fin heat exchanger.

\* \* \* \* \*